(12) United States Patent
Bernreitner et al.

(10) Patent No.: US 8,945,460 B2
(45) Date of Patent: Feb. 3, 2015

(54) EXTRUSION BLOWN MOLDED BOTTLES WITH HIGH STIFFNESS AND TRANSPARENCY

(75) Inventors: Klaus Bernreitner, Linz (AT); Mari Kylmälä, Puchenau (AT); Manfred Kirchberger, Prambachkirchen (AT); Hansjörg Pramer, Gramastetten (AT)

(73) Assignee: Borealis AG, Vienna (AT)

( * ) Notice: Subject to any disclaimer, the term of this patent is extended or adjusted under 35 U.S.C. 154(b) by 851 days.

(21) Appl. No.: 12/998,450

(22) PCT Filed: Oct. 26, 2009

(86) PCT No.: PCT/EP2009/064038
§ 371 (c)(1),
(2), (4) Date: Apr. 21, 2011

(87) PCT Pub. No.: WO2010/049371
PCT Pub. Date: May 6, 2010

(65) Prior Publication Data
US 2011/0193272 A1  Aug. 11, 2011

(30) Foreign Application Priority Data
Oct. 27, 2008 (EP) .................................. 08167594

(51) Int. Cl.
*B29C 49/04* (2006.01)
*C08L 23/12* (2006.01)
*C08L 23/16* (2006.01)
*C08L 23/14* (2006.01)
*C08L 23/10* (2006.01)

(52) U.S. Cl.
CPC ............... *C08L 23/10* (2013.01); *C08L 23/142* (2013.01); *C08L 2203/10* (2013.01); *C08L 2205/06* (2013.01); *C08L 2207/07* (2013.01)
USPC ............................ 264/540; 524/387; 524/528

(58) Field of Classification Search
None
See application file for complete search history.

(56) References Cited

U.S. PATENT DOCUMENTS

| 4,552,930 | A | * | 11/1985 | Hirota et al. ............... 525/333.8 |
| 5,115,027 | A | * | 5/1992 | Ogawa et al. ................. 525/216 |
| 5,234,879 | A | | 8/1993 | Garoff et al. | |
| 6,143,825 | A | | 11/2000 | Beren et al. | |
| 2003/0040583 | A1 | | 2/2003 | Washiyama et al. | |
| 2003/0083437 | A1 | * | 5/2003 | Bugada et al. ................. 525/240 |

(Continued)

FOREIGN PATENT DOCUMENTS

| EP | 0316187 | A2 | 5/1989 |
| EP | 0890612 | A2 | 1/1999 |

(Continued)

OTHER PUBLICATIONS

Lyondellbasell "Metallocene PP Homopolymer". 2008.*

(Continued)

*Primary Examiner* — Randy Gulakowski
*Assistant Examiner* — Christina Wales
(74) *Attorney, Agent, or Firm* — Warn Partners, P.C.

(57) ABSTRACT

A polypropylene composition comprising a random propylene copolymer, a high melt strength polypropylene having a branching index g' of 0.9 or less, a polypropylene having a $MFR_2$ (230° C.) of at least 400.0 g/10 min and a clarifier, wherein the polypropylene composition has a $MFR_2$ (230° C.) of at least 2.0 g/10 min.

19 Claims, 2 Drawing Sheets

(56) References Cited

U.S. PATENT DOCUMENTS

| | | | |
|---|---|---|---|
| 2004/0175591 A1* | 9/2004 | Jaaskelainen et al. | 428/515 |
| 2006/0135699 A1 | 6/2006 | Li et al. | |
| 2008/0227877 A1* | 9/2008 | Stadlbauer et al. | 521/79 |

FOREIGN PATENT DOCUMENTS

| | | |
|---|---|---|
| EP | 1382638 A1 | 1/2004 |
| EP | 0887379 B1 | 12/2004 |
| EP | 1580207 A1 | 9/2005 |
| EP | 1952970 A1 | 8/2008 |
| JP | 2001002883 | 1/2001 |
| WO | 9212182 A1 | 7/1992 |
| WO | 9219653 A1 | 11/1992 |
| WO | 9219658 A1 | 11/1992 |
| WO | 9924479 A1 | 5/1999 |
| WO | 9933843 A1 | 7/1999 |
| WO | 03002639 A1 | 1/2003 |
| WO | 2006061109 A1 | 6/2006 |

OTHER PUBLICATIONS

Equistar "Additives: Nucleating and Clarifying agents".*
Dharia, A.; Foland, R. "Properties and applications of blends of High Melt Strength PP and linear PP" ANTEC 2005. pp. 2156-2162.*
International Search Report for Application No. PCT/EP2009/064038 Filed on Dec. 21, 2009.
Zimm et. al., "The Dimensions of Chain Molecules Containing Branches and Rings", The Journal of Chemical Physics, vol. 17, No. 12, pp. 1301-1314, Dec. 1949, Supplied by The British Library.
Hayashi et. al., "Heptad Configurational Analysis of 13 C n.m.r. Spectra in Highly Isotactic Polypropylene", Polymer, vol. 29, pp. 138-143, Jan. 1988.
Chujo et. al., Two-Site Model Analysis of 13 C n.m.r. of Polypropylene Polymerized by Ziegler-Natta Catalyst with External Alkoxysilane Donors, Polymer, vol. 35, No. 2, pp. 339-342, Copyright 1994 Butterworth-Heinemann Ltd.
Gachter/Muller, Plastics Additives Handbook, 4th Edition, Hansa Publishers, Munich, 1993.
M.N. Wagner et. al., "Rheotens-Mastercurves and Drawability of Polymer Melts", Polymer Engineering and Science, Mid-April vol. 36, No. 7, pp. 925-935.

* cited by examiner

EXTRUSION BLOWN MOLDED BOTTLES WITH HIGH STIFFNESS AND TRANSPARENCY

This application is a National Stage of International Application No. PCT/EP2009/064038, filed Oct. 26, 2009. This application claims priority to European Patent Application No. 08167594.4 filed on Oct. 27, 2008. The disclosures of the above applications are incorporated herein by reference.

The present inventions relates to a new polypropylene composition, its use and manufacture as well as to new articles comprising said polypropylene composition.

It is well known in the polymer field that different applications require specifically tailored polymers to achieve the individual demanding properties. For instance a polymer used for injection molding must necessarily have other properties as a polymer used for blow molding.

The extrusion blow molding process for instance is a very special process that allows in a flexible and cheap way the preparation of different kind of bottles with respect to size and shape. Main drawback in this process is that the solidification step is very special compared to normal injection molding.

In the extrusion blow molding process a polymer melt is first extruded through a tubular die into air forming a polymer tube, subsequently blowing up said polymer tube (typically called "parison" in this technical field) until the outside of the tube reaches the boundaries of the mold. To cover the wall of the mold fully with the blown up polymer tube is rather difficult compared to injection molding because the air between polymer tube and mold has to be removed totally which is a demanding process step. Further the inside of the polymer tube is not in contact with the mold and therefore there is only little possibility to influence the inner surface structure of the tube. As a consequence thereof extrusion blown molded articles, like bottles, normally show less transparency compared to any injection molded articles or injection stretched blown molded articles (ISBM). For instance, the surface property inside and/or outside of extrusion blown bottles is typically non-uniform (flow lines, melt fracture) leading to lower overall transparency compared to injection molded bottles. A certain improvement of the transparency can be achieved by visbreaking the polymer material but this concept has quite some limitation and can only be applied for relatively small bottles since a certain level of melt strength is essential for proper processing. Accordingly bigger bottles (volume of 1 l or more) are not producible with visbroken polypropylene in an extrusion blow molding process.

Beside transparency also stiffness is very important for the performance of a bottle. Higher stiffness would allow reducing the wall thickness of a bottle and is also important for the filling process (no deterioration of the bottle). Moreover a better stiffness leads also to improved stackability. The stiffness of bottles is reflected by the so called top load (top load is the maximum force applied to a bottle before it starts to collapse).

Further it is well known that the extruded parison tends to swell inter alia in wall thickness. Even though the swell effect is to some extent desired it should not diverge too much from known reference grades, in particular from the specific reference grade "RB307MO" of Borealis.

Thus the object of the present invention is to provide a polypropylene composition which enables the preparation of bottles, in particular big sized bottles, i.e. bottles with more than 1 liter filling volume, by an extrusion blow molding process, wherein the bottles are featured by good haze, gloss and stiffness. Further it is desired that during the preparation of the bottles a weight swell occurs, which differs only little from known grades (i.e. "RB307MO" of Borealis) used in extrusion blow molding processes.

The finding of the present invention is that a polypropylene must be combined with a branched polypropylene, like a Y/H-shaped polypropylene, i.e. a high melt strength polypropylene, and a further polypropylene with high melt flow rate.

Accordingly the present invention is directed to a polypropylene composition comprising a random propylene copolymer (R-PP), a high melt strength polypropylene (HMS-PP), a polypropylene (B) being different to the random propylene copolymer (R-PP) at least in view of the melt flow rate $MFR_2$ (230° C.) and a clarifier (C), wherein (a) the random propylene copolymer (R-PP) comprises units derived from propylene and at least another $C_2$ to $C_{20}$ α-olefin, (b) optionally the high melt strength polypropylene (HMS-PP) has a branching index g' of less than 1.0, preferably of 0.9 or less, (c) the polypropylene (B) has a $MFR_2$ (230° C.) of at least 400 g/10 min, (d) the clarifier (C) comprises at least one α-nucleating agent (N), and (e) the polypropylene composition has a $MFR_2$ (230° C.) of at least 2.0 g/10 min.

Thus in a specific embodiment the polypropylene composition according to this invention comprises a random propylene copolymer (R-PP), a high melt strength polypropylene (HMS-PP), a polypropylene (B), and a clarifier (C), wherein (a) the random propylene copolymer (R-PP) comprises units derived from propylene and at least another $C_2$ to $C_{20}$ α-olefin, and additionally
  (i) has a higher branching index g' than the high melt strength polypropylene (HMS-PP), preferably is unbranched, more preferably has a branching index g' of 1.0,
  and/or
  (ii) has a gel content below 0.15 wt.-%, (b) the high melt strength polypropylene (HMS-PP) has a branching structure, preferably has a branching index g' of less than 1.0, more preferably of 0.9 or less, (c) the polypropylene (B) has a $MFR_2$ (230° C.) of at least 400 g/10 min, (d) the clarifier (C) comprises at least one α-nucleating agent (N), and (e) the polypropylene composition has a $MFR_2$ (230° C.) of at least 2.0 g/10 min, wherein further (f) the polypropylene (B) is (chemically) different to the random propylene copolymer (R-PP), preferably the polypropylene (B) is different to the random propylene copolymer (R-PP) at least in view of the melt flow rate $MFR_2$ (230° C.), still more preferably the polypropylene (B) has a higher melt flow rate $MFR_2$ (230° C.) than the random propylene copolymer (R-PP) and (g) optionally the polypropylene (B) is (chemically) different to high melt strength polypropylene (HMS-PP), preferably the polypropylene (B) is (chemically) different to high melt strength polypropylene (HMS-PP) at least in view of the melt flow rate $MFR_2$ (230° C.), still more preferably the polypropylene (B) has a higher melt flow rate $MFR_2$ (230° C.) than the high melt strength polypropylene (HMS-PP).

Preferably the polypropylene compositions as defined above comprise as polymer components only the random propylene copolymer (R-PP), the polypropylene (B) and the high melt strength polypropylene (HMS-PP) as defined above and in further detail below.

It has been surprisingly found out that such a polypropylene composition has superior properties compared to known polypropylene compositions, in particular to those used for extrusion blown molding processes. The polypropylene composition of the present invention enables in particular to produce extrusion blown bottles with low haze, exceptional good gloss and stiffness in terms of high top load. Further it has been observed that the weight swell does not differ from commercial products (see table 1).

BRIEF DESCRIPTION OF THE DRAWINGS

The present invention will become more fully understood from the detailed description and the accompanying drawings, wherein.

Figure 1:
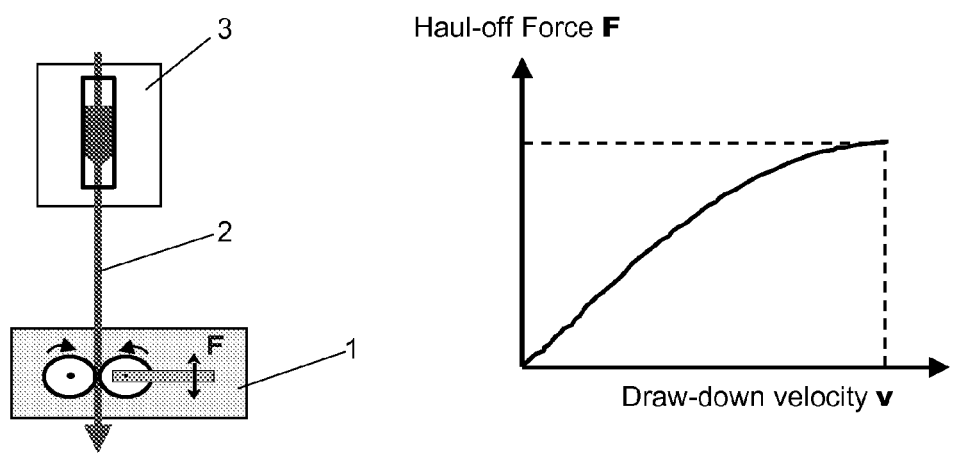
FIG. 1 is a schematic diagram of an experimental procedure which is used to determine strain hardening.

In the following the present invention is described in more detail.

One essential requirement of the inventive polypropylene composition is its increased melt flow rate. The melt flow rate mainly depends on the average molecular weight. This is due to the fact that long molecules render the material a lower flow tendency than short molecules. An increase in molecular weight means a decrease in the MFR-value. The melt flow rate (MFR) is measured in g/10 min of the polymer discharged through a defined die under specified temperature and pressure conditions and the measure of viscosity of the polymer which, in turn, for each type of polymer is mainly influenced by its molecular weight but also by its degree of branching. The melt flow rate measured under a load of 2.16 kg at 230° C. (ISO 1133) is denoted as $MFR_2$ (230° C.). Accordingly, it is preferred that the inventive polypropylene composition has an $MFR_2$ (230° C.) of at least 2.0 g/10 min, more preferably of at least 2.2 g/10 min. Accordingly it is in particular appreciated that the inventive polypropylene composition has a $MFR_2$ (230° C.) in the range of 2.0 to 4.5 g/10 min, more preferably of 2.1 to 3.8 g/10 min, still more preferably of 2.2 to 3.5 g/10 min.

Further, as stated above the new polypropylene composition must comprise a high melt strength polypropylene (HMS-PP). Such polymer types improve the melt strength of the polypropylene composition. Accordingly it is preferred that the polypropylene composition is further characterized by a strain hardening behavior with a haul-off force $F_{max}$ of at least 7.0 cN and a draw down velocity $v_{max}$ of at least 180 mm/s, more preferably by a strain hardening behavior with a haul-off force $F_{max}$ of at least 7.5 cN and a draw down velocity $v_{max}$ of at least 185 mm/s.

Further the polypropylene composition can be additionally defined by the gel content. The gel content is a good indicator for the chemical modification of the polypropylene composition or its components. Accordingly the present invention is featured by relatively moderate gel content, i.e. of not more than 1.00 wt.-%, even more preferred of not more than 0.80 wt.-%, still more preferred of not more than 0.50 wt.-% determined as the relative amount of polymer insoluble in boiling xylene (xylene hot insoluble fraction, XHI). On the other hand the polypropylene composition must comprise a certain amount of high melt strength polypropylene (HMS-PP). Accordingly the amount of gel content in the polypropylene composition is preferably more than 0.15 wt.-%, more preferably of at least 0.27 wt.-%. Thus a preferred range for the gel content of the polypropylene composition is 0.05 to 0.90 wt.-%, like 0.15 to 0.90 wt.-%, more preferred 0.26 to 0.8 wt.-%.

Further it is appreciated that the polypropylene composition is free of any elastomeric polymer component, like an ethylene propylene rubber. In other words the polypropylene composition shall be not a heterophasic polypropylene composition, i.e. a system consisting of a polypropylene matrix in which an elastomeric phase is dispersed. Such systems are featured by a rather high xylene cold soluble content. Accordingly, the present polypropylene composition differs from such a heterophasic system by a rather low xylene cold soluble (XCS) content. Therefore the polypropylene composition has preferably a xylene cold soluble fraction (XCS) of not more than 15.0 wt.-%, more preferably of not more than 14.0 wt.-%, yet more preferably of not more than 12.0 wt.-%, like not more than 11.5 wt.-%.

Further the polypropylene composition can be specified by the amount of comonomer units other than propylene within the polypropylene composition. Accordingly it is appreciated that the amount of units derived from $C_2$ to $C_{20}$ α-olefins other than propylene is not more than 7.0 wt.-%, preferably not more than 6.0 wt.-%, like not more than 5.5 wt.-%, in the polypropylene composition.

In the following the present polypropylene composition is further defined by the polymer components within the composition.

The random propylene copolymer (R-PP) comprises units derived from propylene and at least another $C_2$ to $C_{20}$ α-olefin, preferably at least another $C_2$ to $C_{10}$ α-olefin. Accordingly the random propylene copolymer (R-PP) comprises units derived from propylene and at least another α-olefin selected from the group consisting of ethylene $C_4$ α-olefin, $C_5$ α-olefin, $C_6$ α-olefin, $C_7$ α-olefin, $C_8$ α-olefin, $C_9$ α-olefin and $C_{10}$ α-olefin. More preferably the random propylene copolymer (R-PP) comprises units derived from propylene and at least another α-olefin selected from the group consisting of ethylene, 1-butene, 1-pentene, 1-hexene, 1-heptene, 1-octene, 1-nonene and 1-decene, wherein ethylene, 1-butene and 1-hexene are preferred. It is in particular preferred that the random propylene copolymer (R-PP) consists of units derived from propylene and ethylene. The amount of units derived from $C_2$ to $C_{20}$ α-olefins other than propylene in the random propylene copolymer (R-PP) is in the range of 1.0 to 7.0 wt.-%, more preferably 1.5 to 6.0 wt.-%, still more preferably 2.0 to 5.5 wt.-%.

Preferably the random propylene copolymer (R-PP) is isotactic. Accordingly it is appreciated that the random propylene copolymer (R-PP) has a rather high pentad concentration, i.e. higher than 90%, more preferably higher than 92%, still more preferably higher than 93% and yet more preferably higher than 95%, like higher than 99%.

One requirement in the present invention is that units derived from $C_2$ to $C_{20}$ α-olefins other than propylene within the propylene copolymer (R-PP) are randomly distributed. The Randomness indicates the amount of isolated comonomer units, i.e. those which have no other comonomer units in the neighbour, compared to the total amount of comonomers in the polymer chain. In a preferred embodiment, the randomness of the random propylene copolymer (R-PP) is at least 30%, more preferably at least 50%, even more preferably at least 60%, and still more preferably at least 65%.

Further it is appreciated that the xylene soluble content of the random propylene copolymer (R-PP) is a rather low. Accordingly the random propylene copolymer (R-PP) has preferably a xylene cold soluble fraction (XCS) measured according to ISO 6427 (23° C.) of not more than 14.0 wt.-%, more preferably of not more than 13.0 wt.-%, yet more preferably of not more than 12.0 wt.-%, like not more than 11.5 wt.-%. Thus a preferred range is 1.0 to 14.0 wt.-%, more preferred 1.0 to 13.0 wt.-%, still more preferred 1.2 to 11.0 wt.-%.

The random propylene copolymer (R-PP) can be unimodal or multimodal, like bimodal in view of the molecular weight distribution and/or the comonomer content distribution.

When the random propylene copolymer (R-PP) is unimodal with respect to the molecular weight distribution and/or comonomer content, it may be prepared in a single stage process e.g. as slurry or gas phase process in a slurry or gas phase reactor. Preferably, the unimodal the random propylene copolymer (R-PP) is polymerized as a slurry polymerization. Alternatively, the unimodal the random propylene copolymer (R-PP) may be produced in a multistage process using at each stage process conditions which result in similar polymer properties.

The expression "multimodal" or "bimodal" used herein refers to the modality of the polymer, i.e.
the form of its molecular weight distribution curve, which is the graph of the molecular weight fraction as a function of its molecular weight,
or more preferably
the form of its comonomer content distribution curve, which is the graph of the comonomer content as a function of the molecular weight of the polymer fractions.

As will be explained below, the polymer components of the random propylene copolymer (R-PP) can be produced in a sequential step process, using reactors in serial configuration and operating at different reaction conditions. As a consequence, each fraction prepared in a specific reactor will have its own molecular weight distribution and/or comonomer content distribution.

When the distribution curves (molecular weight or comonomer content) from these fractions are superimposed to obtain the molecular weight distribution curve or the comonomer content distribution curve of the final polymer, these curves may show two or more maxima or at least be distinctly broadened when compared with curves for the individual fractions. Such a polymer, produced in two or more serial steps, is called bimodal or multimodal, depending on the number of steps.

Accordingly the random propylene copolymer (R-PP) may be multimodal, like bimodal, in view of the comonomer content and/or molecular weight. It is in particular appreciated that the random propylene copolymer (R-PP) is multimodal, like bimodal, in view of the comonomer content.

Further in case the random propylene copolymer (R-PP) is of multimodal, like bimodal, character, in particular multimodal, like bimodal, in view of the comonomer content, it is appreciated that the individual fractions are present in amounts influencing the properties of the material. Accordingly it is appreciated that each of these fractions is at least present in the amount of 10 wt.-% based on the random propylene copolymer (R-PP). Accordingly in case of a bimodal system, in particular in view of the comonomer content, the split of the two fractions is roughly 50:50.

Thus in one embodiment the random propylene copolymer (R-PP) comprises two fractions which differ in their comonomer content, like ethylene content (preferably as the only comonomer in the random propylene copolymer (R-PP)), wherein the first fraction is present from 40 to 60 wt.-% and the second fraction from 60 to 40 wt.-%. In such a case the random propylene copolymer (R-PP) comprises at least two fractions, more preferably consists of two fractions, that have a comonomer content, like ethylene content, which differ of at least 2.0 wt.-%, more preferably differ of at least 2.5 wt.-%. On the other hand the difference in the comonomer content in the two fractions should be not too high, i.e. not higher than 6.0 wt.-%, preferably not higher than 5.0 wt %, to avoid any separation tendencies. Thus it is appreciated that the random propylene copolymer (R-PP) comprises at least two fractions, more preferably consists of two fractions, that have comonomer contents which differ of 2.0 to 6.0 wt.-%, more preferably of 2.5 to 5.0 wt.-%. Accordingly in one embodiment the random propylene copolymer (R-PP) consists of a first fraction being a propylene homopolymer and a second fraction being a propylene copolymer having a comonomer content, preferably ethylene content, of at least 2.0 wt.-%, more preferably of at least 3.0 wt.-%, like at least 3.5 wt.-%.

As comes already apparent from the wording used in the instant invention the random propylene copolymers (R-PP) is not only chemically different to the propylene (B) but different to the high melt strength polypropylene (HMS-PP). One essential difference is that the random propylene copolymers (R-PP) (compared to the high melt strength polypropylene (HMS-PP)) is unbranched. In other words the random propylene copolymers (R-PP) has preferably a branching index g' of 1.0. A further distinguishing feature between the high melt strength polypropylene (HMS-PP) and the random propylene copolymers (R-PP) is preferably the gel content expressed in the amount of the xylene hot insoluble fraction (XHI). Accordingly the random propylene copolymers (R-PP) has a gel content below 0.15 wt.-%, more preferably has no detectable gel content.

In particular suitable random propylene copolymers (R-PP) are those as for instance described in EP 1 580 207 A1 and WO 2003/002639 A1.

As stated above, the inventive polypropylene composition must at least comprise—as polymer components—a random propylene copolymer (R-PP), a polypropylene (B) and a high melt strength polypropylene (HMS-PP). The three components must be chosen in such a way that in particular the required $MFR_2$ (230° C.) of at least 2.0 g/10 min for the final polypropylene composition is met. In principle visbreaking is an option to increase the melt flow rate of the polypropylene composition. However even though it has been discovered that visbreaking of a polypropylene composition may improve the haze and gloss of the extrusion blown molded articles, it has been now surprisingly found out that the increase of the melt flow rate by the incorporation of a viscous polypropylene, i.e. polypropylene (B), leads to much better properties. Without be bonded to the theory, it is believed that the addition of a polypropylene with rather high melt flow rate to a mixture of non-visbroken random propylene copolymer (R-PP) and a high melt strength polypropylene (HMS-PP) leads to much better haze and gloss properties compared to a visbroken polypropylene of random propylene copolymer (R-PP) and optionally high melt strength polypropylene (HMS-PP), since the viscous polypropylene may improve the surface of the extrusion blown molded articles and therewith the overall transparency of said article. Accordingly it is preferred that neither the polypropylene composition as whole nor the random propylene copolymer (R-PP) has been visbroken.

Accordingly, it is appreciated that the random propylene copolymer (R-PP) has a $MFR_2$ (230° C.) of at least 0.5 g/10 min, more preferably in the range of 0.5 to 2.8 g/10 min, yet more preferably of 1.0 to 2.5 g/10 min, like 1.3 to 2.0 g/10 min.

The preparation of the random propylene copolymer (R-PP) will be defined in more detail below.

As a further essential requirement of the present invention a high melt strength polypropylene (HMS-PP) must be used. Such polymer types are characterized by a certain degree of branching. Possible high melt strength polypropylenes (HMS-PP) are so called Y/H-polypropylenes and for instance described in EP 0 787 750, i.e. single branched polypropylene types (Y polypropylenes having a backbone with a single long side-chain and an architecture resembles a "Y") and polypropylene types in which polymer chains are coupled with a bridging group (an architecture resembles a "H"). Such polypropylenes are characterized by rather high melt strength. A parameter of the degree of branching is the branching index g'. The branching index g' correlates with the amount of branches of a polymer. The branching index g' is defined as g'=$[IV]_{br}/[IV]_{lin}$ in which g' is the branching index, $[IV]_{br}$ is the intrinsic viscosity of the branched polypropylene and $[W]_{lin}$ is the intrinsic viscosity of the linear polypropylene having the same weight average molecular weight (within a range of ±10%) as the branched polypropylene. Thereby, a low g'-value is an indicator for a high branched polymer. In other words, if the g'-value decreases, the branching of the polypropylene increases. Reference is made in this context to B. H. Zimm and W. H. Stockmeyer, J. Chem. Phys. 17, 1301 (1949). This document is herewith included by reference. Thus it is preferred that the branching index g' of the high melt strength polypropylene (HMS-PP) shall be less than 1.0, more preferably equal or less than 0.9, like less than 0.8. In another preferred embodiment the branching index g' of the high melt strength polypropylene (HMS-PP) shall be preferably less than 0.7.

The high degree of branching of the high melt strength polypropylene (HMS-PP) contributes also to its melt strength. Accordingly it is preferred that the high melt strength polypropylene (HMS-PP) is further characterized by a strain hardening behavior with a haul-off force $F_{max}$ of at least 10.0 cN and a draw down velocity $v_{max}$ of at least 200 mm/s, more preferably by a strain hardening behavior with a haul-off force $F_{max}$ of at least 20.0 cN and a draw down velocity $v_{max}$ of at least 250 mm/s, yet more preferably by a strain hardening behavior with a haul-off force $F_{max}$ of at least 25.0 cN and a draw down velocity $v_{max}$ of at least 250 mm/s.

Such a high melt strength polypropylene (HMS-PP) is preferably obtained by modifying, i.e. chemically modifying, a polypropylene. Such a modification is necessary to achieve the branching structure and/or the strain hardening phenomena of the high melt strength polypropylene (HMS-PP). Such a modification has also influence on the gel content of the high melt strength polypropylene (HMS-PP). Accordingly it is justified to define the high melt strength polypropylene (HMS-PP) further and/or alternatively by its gel content. Thus it is appreciated that the high melt strength polypropylene (HMS-PP) is featured by a relatively moderate gel content, i.e. of not more than 1.00 wt.-%, even more preferred of not more than 0.80 wt.-%, still more preferred of not more than 0.50 wt.-% determined as the relative amount of polymer insoluble in boiling xylene (xylene hot insoluble fraction, XHI). On the other hand the high melt strength polypropylene (HMS-PP) may show a certain degree of branching and thus a certain amount of gel content, i.e. of at least 0.15 wt.-%, more preferably of at least 0.27 wt.-%. Thus a preferred range for the gel content of the high melt strength polypropylene (HMS-PP) is 0.05 to 0.90 wt.-%, more preferred 0.26 to 0.8 wt.-%.

Additionally it is preferred that in the melt strength polypropylene (HMS-PP) has an $MFR_2$ (230° C.) in a range of 1.0 to 10.0 g/10 min, more preferably of 4.0 to 8.5 g/10 min, still more preferably of 6.0 to 8.0 g/10 min.

Preferably, the high melt strength polypropylene (HMS-PP) has a density of at least 850 kg/m$^3$, more preferably of at least 875 kg/m$^3$ and most preferably of at least 900 kg/m$^3$.

Further, preferably, the high melt strength polypropylene (HMS-PP) has a density of not more than 950 kg/m$^3$, more preferably of not more than 925 kg/m$^3$ and most preferably of not more than 910 kg/m$^3$.

Preferably, the high melt strength polypropylene (HMS-PP) has a melting point of at least 140° C., more preferably of at least 150° C. and most preferably of at least 160° C.

As stated above, the melt strength polypropylene (HMS-PP) is preferably a modified polypropylene. Accordingly the melt strength polypropylene (HMS-PP) can be further defined by the way obtained. Thus the melt strength polypropylene (HMS-PP) is preferably the result of treating an unmodified polypropylene (A) with thermally decomposing radical-forming agents and/or with ionizing radiation. However in such a case a high risk exists that the polypropylene (A) is degraded, which is detrimental. Thus it is preferred that the modification is accomplished by the use of bifunctionally unsaturated monomer(s) and/or multifunctionally unsaturated low molecular weight polymer(s) as chemically bound bridging unit(s). A suitable method to obtain the melt strength polypropylene (HMS-PP) is for instance disclosed in EP 0 787 750, EP 0 879 830 A1 and EP 0 890 612 A2. All documents are herewith included by reference. Thereby, the amount of peroxide is preferably in the range of 0.05 to 3.00 wt.-% based on the unmodified polypropylene (A).

Accordingly in one preferred embodiment the high melt strength polypropylene (HMS-PP) comprises units derived from
(i) propylene and
(ii) bifunctionally unsaturated monomer(s) and/or multifunctionally unsaturated low molecular weight polymer(s).

"Bifunctionally unsaturated or multifunctionally unsaturated" as used above means preferably the presence of two or more non-aromatic double bonds, as in e.g. divinylbenzene or cyclopentadiene or polybutadiene. Only such bi- or multifunctionally unsaturated compounds are used which can be polymerized preferably with the aid of free radicals. The unsaturated sites in the bi- or multifunctionally unsaturated compounds are in their chemically bound state not actually "unsaturated", because the double bonds are each used for a covalent bond to the polymer chains of the polypropylene (A).

Reaction of the bifunctionally unsaturated monomer(s) and/or multifunctionally unsaturated low molecular weight polymer(s), preferably having a number average molecular weight ($M_n$)≤10000 g/mol, synthesized from one and/or more unsaturated monomers with the propylene polymer composition may be performed in the presence of a thermally free radical forming agent, e.g. decomposing free radical-forming agent, like a thermally decomposable peroxide and/or ionizing radiation or microwave radiation.

The bifunctionally unsaturated monomers may be
divinyl compounds, such as divinylaniline, m-divinylbenzene, p-divinylbenzene, divinylpentane and divinylpropane;
allyl compounds, such as allyl acrylate, allyl methacrylate, allyl methyl maleate and allyl vinyl ether;
dienes, such as 1,3-butadiene, chloroprene, cyclohexadiene, cyclopentadiene, 2,3-dimethylbutadiene, heptadiene, hexadiene, isoprene and 1,4-pentadiene;
aromatic and/or aliphatic bis(maleimide) bis(citraconimide) and mixtures of these unsaturated monomers.

Especially preferred bifunctionally unsaturated monomers are 1,3-butadiene, isoprene, dimethyl butadiene and divinylbenzene.

The multifunctionally unsaturated low molecular weight polymer, preferably having a number average molecular weight ($M_n$)≤10000 g/mol may be synthesized from one or more unsaturated monomers.

Examples of such low molecular weight polymers are
- polybutadienes, especially where the different microstructures in the polymer chain, i.e. 1,4-cis, 1,4-trans and 1,2-(vinyl) are predominantly in the 1,2-(vinyl) configuration
- copolymers of butadiene and styrene having 1,2-(vinyl) in the polymer chain.

A preferred low molecular weight polymer is polybutadiene, in particular a polybutadiene having more than 50.0 wt.-% of the butadiene in the 1,2-(vinyl) configuration.

The high melt strength polypropylene (HMS-PP) may contain more than one bifunctionally unsaturated monomer and/or multifunctionally unsaturated low molecular weight polymer. Even more preferred the amount of bifunctionally unsaturated monomer(s) and multifunctionally unsaturated low molecular weight polymer(s) together in the high melt strength polypropylene (HMS-PP) is 0.01 to 10.0 wt.-% based on said high melt strength polypropylene (HMS-PP).

As stated above it is preferred that the bifunctionally unsaturated monomer(s) and/or multifunctionally unsaturated low molecular weight polymer(s) are used in the presence of a thermally decomposing free radical-forming agent.

Peroxides are preferred thermally decomposing free radical-forming agents. More preferably the thermally decomposing free radical-forming agents are selected from the group consisting of acyl peroxide, alkyl peroxide, hydroperoxide, perester and peroxycarbonate.

The following listed peroxides are in particular preferred:

Acyl peroxides: benzoyl peroxide, 4-chlorobenzoyl peroxide, 3-methoxybenzoyl peroxide and/or methyl benzoyl peroxide.

Alkyl peroxides: allyl t-butyl peroxide, 2,2-bis(t-butylperoxybutane), 1,1-bis(t-butylperoxy)-3,3,5-trimethylcyclohexane, n-butyl-4,4-bis(t-butylperoxy) valerate, diisopropylaminomethyl-t-amyl peroxide, dimethylaminomethyl-t-amyl peroxide, diethylaminomethyl-t-butyl peroxide, dimethylaminomethyl-t-butyl peroxide, 1,1-di-(t-amylperoxy)cyclohexane, t-amyl peroxide, t-butylcumyl peroxide, t-butyl peroxide and/or 1-hydroxybutyl n-butyl peroxide.

Peresters and peroxy carbonates: butyl peracetate, cumyl peracetate, cumyl perpropionate, cyclohexyl peracetate, di-t-butyl peradipate, di-t-butyl perazelate, di-t-butyl perglutarate, di-t-butyl perthalate, di-t-butyl persebacate, 4-nitrocumyl perpropionate, 1-phenylethyl perbenzoate, phenylethyl nitro-perbenzoate, t-butylbicyclo-(2,2,1)heptane percarboxylate, t-butyl-4-carbomethoxy perbutyrate, t-butylcyclobutane percarboxylate, t-butylcyclohexyl peroxycarboxylate, t-butylcyclopentyl percarboxylate, t-butylcyclopropane percarboxylate, t-butyldimethyl percinnamate, t-butyl-2-(2,2-diphenylvinyl) perbenzoate, t-butyl-4-methoxy perbenzoate, t-butylperbenzoate, t-butylcarboxycyclohexane, t-butyl pernaphthoate, t-butyl peroxyisopropylcarbonate, t-butyl pertoluate, t-butyl-1-phenylcyclopropyl percarboxylate, t-butyl-2-propylperpentene-2-oate, t-butyl-1-methylcyclopropyl percarboxylate, t-butyl-4-nitrophenyl peracetate, t-butylnitrophenyl peroxycarbamate, t-butyl-N-succiimido percarboxylate, t-butyl percrotonate, t-butyl permaleic acid, t-butyl permethacrylate, t-butyl peroctoate, t-butyl peroxyisopropylcarbonate, t-butyl perisobutyrate, t-butyl peracrylate and/or t-butyl perpropionate.

Or mixtures of these above listed free radical-forming agents.

The unmodified polypropylene (A) to prepare such a high melt strength polypropylene (HMS-PP) has preferably a $MFR_2$ (230° C.) in a range of 0.05 to 45.00 g/10 min. More preferably the $MFR_2$ (230° C.) is in a range of 0.05 to 35.00 g/10 min in case the unmodified polypropylene (A) is a homopolymer. On the other hand the $MFR_2$ (230° C.) is in a range of 0.05 to 45.00 g/10 min in case the unmodified polypropylene (A) is a copolymer.

Preferably the unmodified polypropylene (A) is a homopolymer. The expression homopolymer used in the instant invention relates to a polypropylene that consists substantially, i.e. of at least 97 wt.-%, preferably of at least 98 wt.-%, more preferably of at least 99 wt.-%, still more preferably of at least 99.8 wt.-% of propylene units. In a preferred embodiment only propylene units in the propylene homopolymer are detectable. The comonomer content can be determined with FT infrared spectroscopy, as described below in the examples.

Preferably the high melt strength polypropylene (HMS-PP) is produced from the unmodified polypropylene (A) as defined above under process conditions as defined in detail below.

As a further polymer component a viscous polypropylene is required. As stated above this polypropylene (B) must be chemically different to the random propylene copolymer (R-PP). Of course the propylene (B) is also preferably chemically different to the high melt strength polypropylene (HMS-PP).

One essential difference between the polypropylene (B) and the high melt strength polypropylene (HMS-PP) is that the polypropylene (B) is an unbranched polypropylene whereas the high melt strength polypropylene (HMS-PP) shows a branching structure. In other words the polypropylene (B) has preferably a branching index g' of 1.0. A further distinguishing feature between the high melt strength polypropylene (HMS-PP) and the polypropylene (B) is preferably the gel content expressed in the amount of the xylene hot insoluble fraction (XHI). Accordingly the polypropylene (B) has a gel content below 0.15 wt.-%, more preferably has no detectable gel content. A further difference between the polypropylene (B) and the high melt strength polypropylene (HMS-PP) is preferably that they differ in the melt flow rate $MFR_2$ (230° C.), i.e. the polypropylene (B) has a higher $MFR_2$ (230° C.) than the high melt strength polypropylene (HMS-PP).

The difference between the polypropylene (B) and the random propylene copolymer (R-PP) is preferably that they differ in the melt flow rate $MFR_2$ (230° C.), i.e. the polypropylene (B) has a higher $MFR_2$ (230° C.) than the random propylene copolymer (R-PP). Accordingly it is appreciated that the polypropylene (B) has a $MFR_2$ (230° C.) of at least 400 g/10 min, more preferably at least 430 g/10 min, like at least 450 g/10 min, yet more preferably at least 800 g/10 min, like about 1,200 g/10 min. On the other hand the hand the polypropylene (B) should be not to viscous not to deteriorate the stiffness of the final product. Accordingly it is appreciated that the polypropylene (B) has a $MFR_2$ (230° C.) in the range of 400 to 3,000 g/10 min, more preferably in the range of 420 to 2,000 g/10 min, like 440 to 1,500 g/10 min.

Further the molecular weight distribution (MWD) is desirable rather low. Accordingly it is preferred that the Mw/Mn (MWD) of the polypropylene (B) is below 4.5, like from 0.5 to 4.5, more preferably below 4.0, like from 0.5 to 4.0.

Additionally it is appreciated that the polypropylene (B) has xylene cold soluble fraction (XCS) of not more than 5.0 wt.-%, like 0.5 to 4.5 wt.-%, more preferably of not more than 3.5 wt.-%, like 0.5 to 3.0 wt.-%.

The polypropylene (B) as defined throughout the present invention can be obtained by visbreaking as defined in detail below or by polymerization of propylene for instance in the presence of a metallocene catalyst. One suitable polypropylene obtained by metallocene polymerization technology is the commercial product MF650W of Basell. However it is appreciated in the present application that the polypropylene is in particular obtained by visbreaking.

Accordingly, to achieve the desired MFR range, the polypropylene (B) is typically prepared by polymerizing propylene and optional comonomers to a relatively high molecular weight, which is then treated with peroxide to reduce its molecular weight to a desired average ("visbroken"). Accordingly the polypropylene (B) is preferably a visbroken polypropylene.

More preferably the initial polypropylene used for the preparation of the polypropylene (B) is chosen in such a manner that the visbreaking ratio (final $MFR_2$ (230° C.)/ initial $MFR_2$ (230° C.)) is 3.5 to 40.0, more preferably 4.0 to 30.0, wherein "initial $MFR_2$ (230° C.)" is the $MFR_2$ (230° C.) of the polypropylene before visbreaking and "final $MFR_2$ (230° C.)" is the $MFR_2$ (230° C.) of the polypropylene (B).

The preparation of the polypropylene (B) will be defined in more detail below.

Further, the polypropylene (B) can be a propylene copolymer, like a random propylene copolymer (B') or a propylene homopolymer (B"), the latter being preferred. In case polypropylene (B) is a random propylene copolymer (B'), the copolymer (B') comprises preferably units derived from propylene and at least another $C_2$ to $C_{20}$ α-olefin, preferably at least another $C_2$ to $C_{10}$ α-olefin. Accordingly such a random propylene copolymer (B') comprises units derived from propylene and at least another α-olefin selected from the group consisting of ethylene, 1-butene, 1-pentene, 1-hexene, 1-heptene, 1-octene, 1-nonene and 1-decene, wherein ethylene, 1-butene and 1-hexene are preferred. It is in particular preferred that such a random propylene copolymer (B') consists of units derived from propylene and ethylene. The amount of units derived from $C_2$ to $C_{20}$ α-olefins other than propylene in the random propylene copolymer (B') is in the range of 1.0 to 7.0 wt.-%, more preferably 1.5 to 6.0 wt.-%, still more preferably 2.0 to 5.5 wt.-%.

Preferably the polypropylene (B) is isotactic. Accordingly it is appreciated that the polypropylene (B) has a rather high pentad concentration, i.e. higher than 90%, more preferably higher than 92%, still more preferably higher than 93% and yet more preferably higher than 95%, like higher than 99%.

Another essential requirement of the present invention is that polypropylene composition comprises a clarifier (C) comprising at least one α-nucleating agent (N). Thus as β-nucleating agents negatively influences α-nucleating effect (of the α-nucleating agent) it is preferred that the clarifier (C) and/or the polypropylene composition is (essentially) free of β-nucleating agents. Thus even more preferably the clarifier (C) consists of at least one α-nucleating agent (N). Accordingly the clarifier (C) may comprise, preferably consists of, one, two or three α-nucleating agent(s) (N). However it is appreciated that the clarifier (C) is α-nucleating agent (N).

In principle any α-nucleating agent (N) can be used.

Examples of suitable α-nucleating agents are selected from the group consisting of (i) salts of monocarboxylic acids and polycarboxylic acids, e.g. sodium benzoate or aluminum tert-butylbenzoate, and (ii) dibenzylidenesorbitol (e.g. 1,3:2,4 dibenzylidenesorbitol) and $C_1$-$C_8$-alkyl-substituted dibenzylidenesorbitol derivatives, such as methyldibenzylidenesorbitol, ethyldibenzylidenesorbitol or dimethyldibenzylidenesorbitol (e.g. 1,3:2,4 di(methylbenzylidene)sorbitol), nonitol,1,2,3,-trideoxy-4,6:5,7-bis-O-[(4-propylphenyl)methylene]-nonitol, and (iii) salts of diesters of phosphoric acid, e.g. sodium 2,2'-methylenebis(4,6,-di-tert-butylphenyl)phosphate or aluminium-hydroxy-bis[2,2'-methylene-bis(4,6-di-t-butylphenyl)phosphate], and (iv) vinylcycloalkane polymer and vinylalkane polymer.

Such additives are generally commercially available and are described, for example, in Gachter/Muller, Plastics Additives Handbook, 4th Edition, Hansa Publishers, Munich, 1993.

The nucleating agent content of the polypropylene composition is preferably up to 5 wt.-%. In a preferred embodiment, the polypropylene composition of the present invention contain from 0.01 to 5.0 wt.-%, preferably from 0.02 to 0.50 wt.-%, of a α-nucleating, in particular dibenzylidenesorbitol (e.g. 1,3:2,4 dibenzylidene sorbitol) or a dibenzylidenesorbitol derivative, preferably dimethyldibenzylidenesorbitol (e.g. 1,3:2,4 di(methylbenzylidene) sorbitol) and/or nonitol,1,2,3,-trideoxy-4,6:5,7-bis-O-[(4-propylphenyl)methylene]-nonitol, The most preferred α-nucleating is nonitol,1,2,3,-trideoxy-4,6:5,7-bis-O-[(4-propylphenyl)methylene]-nonitol. Accordingly in a especially preferred embodiment the clarifier (C) comprises, even more preferred consists of, nonitol,1,2,3,-trideoxy-4,6:5,7-bis-O-[(4-propylphenyl)methylene]-nonitol.

In case the α-nucleating agents are polymeric α-nucleating agents selected from the group consisting of vinylcycloalkane polymers and vinylalkane polymers, these polymeric nucleating agents are either accomplished by a special reactor technique, where the catalyst is prepolymerised with monomers like e.g. vinylcyclohexane (VCH), or by blending the polypropylene composition with the vinylcycloalkane polymer or vinylalkane polymer. These methods are described in greater detail in e.g. EP 0 316 187 A2 and WO 99/24479

To obtain especially good results the required components as defined above may be present in specific amounts within the new polypropylene composition. Thus it is preferred that the polypropylene composition according to the instant invention comprises (a) 50.0 to 92.0 wt.-%, more preferably 60.0 to 90.0 wt.-%, yet more preferably 65.0 to 90.0 wt.-%, of the random propylene copolymer (R-PP), (b) 5.0 to 26.0 wt.-%, more preferably 6.0 to 18.0 wt.-%, yet more preferably 6.5 to 16.0 wt.-%, of the high melt strength polypropylene (HMS-PP), (c) 1.0 to 15.0 wt.-%, more preferably 1.5 to 17.0 wt.-%, yet more preferably 2.0 to 10.0 wt.-%, of the polypropylene (B), and (d) 0.01 to 5.0 wt.-%, more preferably 0.02 to 1.0 wt.-%, yet more preferably 0.03 to 0.7 wt.-%, of the clarifier (C), based on the total polypropylene composition.

The polypropylene composition of the present invention may comprise further components. However it is preferred that the polypropylene composition comprises as polymer components only the random propylene copolymer (R-PP), the polypropylene (B) and the high melt strength polypropylene (HMS-PP) as defined above. Accordingly the amounts of the random propylene copolymer (R-PP), the polypropylene (B), the high melt strength polypropylene (HMS-PP) and the clarifier (C) may not result in 100 wt.-% based on the total polypropylene composition. Thus the remaining part up 100.0 wt.-% may be accomplished by further additives known in the art. However this remaining part shall be not more than 10.0 wt.-% within the total composition. For instance the inventive polypropylene composition may comprise additionally small amounts of stabilizers, acid scavengers, lubricants and mold release agents, fillers, nucleating agents, antistatics, plasticizers, dyes, pigments or flame retardants. In general, these are incorporated during granulation of the pulverulent product obtained in the polymerization.

The present invention is also directed to the use of the above defined polypropylene composition. Accordingly the polypropylene composition as defined in the instant invention is used for the preparation of extrusion blown molded products. More particularly the present invention is directed to the use of the polypropylene composition of the instant invention to improve the haze and/or gloss of extrusion blown molded articles, like extrusion blown molded bottles, i.e. extrusion blown molded bottles with a filling volume of 1 liter or more, made out of said polypropylene composition compared to conventional extrusion blown molded bottles, in particular compared to extrusion blown molded bottles made out of the commercial product "RB307MO" of Borealis. Moreover the use of the polypropylene composition of the instant invention shall preferably and additionally improve the top load of extrusion blown molded articles, like extrusion blown molded bottles, i.e. extrusion blown molded bottles with a filling volume of 1 liter or more, made out of said polypropylene composition compared to conventional extrusion blown molded bottles. Accordingly the present invention is in particular directed to the use of polypropylene composition of the instant invention to accomplish at least one requirement, preferably all requirements, selected from the group consisting of a haze of below 14%, more preferably below 11%, a gloss (inside and/or outside of the bottle) of at least 16%, more preferably at least 19%, and top load of at least 280 N, more preferably at least 300 N, for extrusion blown molded articles, like extrusion blown molded bottles, i.e. extrusion blown molded bottles with a filling volume of 1 liter or more.

Further the present invention is directed to extrusion blown molded articles comprising, preferably comprising at least 90 wt.-%, more preferably consisting of, a polypropylene composition according to this invention. More particularly the present invention is directed to bottles, especially to bottles with a filling volume of 1 liter or more, produced by an extrusion blown process comprising, preferably comprising at least 90 wt.-%, more preferably consisting of, a polypropylene composition according to this invention.

In the following the preparation of the inventive polypropylene composition is described in more detail.

The individual components used for the inventive polypropylene composition are known by the person skilled in the art and thus can be readily produced by the information provided herein.

For instance the random propylene copolymer (R-PP) as defined in the instant invention may be prepared by polymerizing, in a slurry reactor, for example a loop reactor, propylene optionally together with at least another $C_2$ to $C_{20}$ α-olefin (comonomers), in the presence of a polymerization catalyst to produce a part of the random propylene copolymer (R-PP). This part is then transferred to a subsequent gas phase reactor, wherein in the gas phase reactor propylene is reacted in the presence of suitably selected other $C_2$ to $C_{20}$ α-olefin(s) (comonomers) in order to produce a further part in the presence of the reaction product of the first step. This reaction sequence provides a reactor blend of parts (i) and (ii) constituting a random propylene copolymer (R-PP). It is of course possible by the present invention that the first reaction is carried out in a gas phase reactor while the second polymerization reaction is carried out in a slurry reactor, for example a loop reactor. It is furthermore also possible to reverse the order of producing parts (i) and (ii), which has been described above in the order of first producing part (i) and then producing part (ii). The above-discussed process, comprising at least two polymerization steps, is advantageous in view of the fact that it provides easily controllable reaction steps enabling the preparation of a desired reactor blend. The polymerization steps may be adjusted, for example by appropriately selecting monomer feed, comonomer feed, hydrogen feed, temperature and pressure in order to suitably adjust the properties of the polymerization products obtained. It is in particular possible to obtain a multimodality, preferably the bimodality, of the random propylene copolymer (R-PP), with respect to the comonomer, like ethylene, distribution as well as with respect to the molecular weights and $MFR_2$ (230° C.) values during said multistage polymerization procedures.

Such a process can be carried out using any suitable catalyst for the preparation of the random propylene copolymer (R-PP). Preferably, the process as discussed above is carried out using a Ziegler-Natta catalyst, in particular a high yield Ziegler-Natta catalyst (so-called fourth and fifth generation type to differentiate from low yield, so called second generation Ziegler-Natta catalysts). A suitable Ziegler-Natta catalyst to be employed in accordance with the present invention comprises a catalyst component, a co-catalyst component and at least one electron donor (internal and/or external electron donor, preferably at least one external donor). Preferably, the catalyst component is a Ti—Mg-based catalyst component and typically the co-catalyst is an Al-alkyl based compound. Suitable catalysts are in particular disclosed in U.S. Pat. No. 5,234,879, WO 92/19653, WO 92/19658 and WO 99/33843.

Preferred external donors are the known silane-based donors, such as dicyclopentyl dimethoxy silane or cyclohexyl methyldimethoxy silane.

One embodiment of a process as discussed above is a loop-gas phase process, such as developed by Borealis, known as Borstar® technology, described for example in EP 0 887 379 A1 and WO 92/12182.

With respect to the above-mentioned preferred slurry-gas phase process, the following general information can be provided with respect to the process conditions.

Temperature of from 40 to 110° C., preferably between 60 and 100° C., in particular between 80 and 90° C., with a pressure in the range of from 20 to 80 bar, preferably 30 to 60 bar, with the option of adding hydrogen in order to control the molecular weight. The reaction product of the slurry polymerization, which preferably is carried out in a loop reactor, is then transferred to the subsequent gas phase reactor, wherein the temperature preferably is within the range of from 50 to 130° C., more preferably 80 to 100° C., at a pressure in the range of from 5 to 50 bar, preferably 15 to 35 bar, again with the option of adding hydrogen in order to control the molecular weight.

The residence time can vary in the reactor zones identified above. In embodiments, the residence time in the slurry reaction, for example the loop reactor, is in the range of from 0.5 to 5 hours, for example 0.5 to 2 hours, while the residence time in the gas phase reactor generally will be from 1 to 8 hours.

The properties of the random propylene copolymer (R-PP) produced with the above-outlined process may be adjusted and controlled with the process conditions as known to the skilled person, for example by one or more of the following process parameters: temperature, hydrogen feed, comonomer feed, propylene feed, catalyst, type and amount of external donor, split between two or more components of a multimodal polymer.

The high melt strength polypropylene (HMS-PP) is preferably obtained by a process as described in EP 0 879 830 A1 and EP 0 890 612 A2. Both documents are herewith included by reference. Accordingly the high melt strength polypropylene (HMS-PP) is produced by (a) mixing
 (i) a unmodified propylene homopolymer and/or copolymer (A) as defined above, preferably a unmodified propylene homopolymer with a weight average molecular weight ($M_w$) of 500,000 to 1,500,000 g/mol,
 (ii) from 0.05 to 3 wt.-% based on the components of (i) and (ii), of a peroxide selected from the group consisting of acyl peroxide, alkyl peroxide, hydroperoxide, perester and peroxycarbonate, and
 (iii) optionally diluted with inert solvents,
(b) heating to 30 to 100° C., preferably to 60 to 90° C.,
(c) sorption of volatile bifunctional monomers, preferably ethylenically unsaturated, multifunctional monomers, like $C_4$ to $C_{10}$ dienes and/or $C_7$ to $C_{10}$ divinyl compounds, by the unmodified propylene homopolymer and/or copolymer (A), preferably unmodified propylene homopolymer (A), from the gas phase at a temperature of from 20 to 120° C., preferably of from 60 to 100° C., where the amount of the absorbed bifunctionally unsaturated monomers is from 0.01 to 10.00 wt.-%, preferably from 0.05 to 2.00 wt.-%, based on the propylene homopolymer (A),
(d) heating and melting the polypropylene composition in an atmosphere comprising inert gas and/or the volatile bifunctional monomers, from sorption temperature to 210° C., whereupon the free-radical generators are decomposed and then
(e) heating the melt up to 280° C. in order to remove unreacted monomers and decomposition products, and
(f) agglomerating the melt.

The process for producing the high melt strength polypropylene (HMS-PP) preferably is a continuous method, performed in continuous reactors, mixers, kneaders and extruders. Batchwise production of the high melt strength polypropylene (HMS-PP), however is feasible as well.

Practical sorption times τ of the volatile bifunctional monomers range from 10 to 1000 s, where sorption times τ of 60 to 600 are preferred.

The visbreaking may be carried out in any known manner, but typically the present invention envisages chemical visbreaking using a peroxide visbreaking agent. Suitable amounts of peroxide to be employed in accordance with the present invention are in principle known to the skilled person and can easily be calculated on the basis of the amount of polypropylene composition and/or random propylene copolymer (R-PP) to be subjected to visbreaking, the $MFR_2$ (230° C.) value of the polypropylene composition and/or random propylene copolymer (R-PP) to be subjected to visbreaking and the desired target $MFR_2$ (230° C.) of the product to be obtained. Accordingly, typical amounts of peroxide visbreaking agent are from 0.005 to 1.0 wt.-%, more preferably from 0.01 to 0.5 wt.-%, based on the amount of propylene polymer employed.

Typically, visbreaking in accordance with the present invention is carried out in an extruder, so that under the suitable conditions, an increase of melt flow rate is obtained. During visbreaking, higher molar mass chains of the starting product are broken statistically more frequently than lower molar mass molecules, resulting in an overall decrease of the average molecular weight and an increase in melt flow rate.

As mentioned above, the polypropylene (B) is preferably obtained by visbreaking in a manner well known to those skilled in the art. Preferably it is performed as follows: a propylene polymer in particulate form, e.g. "as polymerized" flake or pelletized, has sprayed thereon or blended therewith, a prodegradant or free radical generating source, e.g. a peroxide in liquid or powder form or absorbed on and/or in a carrier, e.g. polypropylene/peroxide concentrate. Typical visbreaking agents are 2,5-dimethyl-2,5-bis(tert.butyl-peroxy) hexane (DHBP) (for instance sold under the tradenames Luperox 101 and Trigonox 101), 2,5-dimethyl-2,5-bis(tert-.butyl-peroxy)hexyne-3 (DYBP) (for instance sold under the tradenames Luperox 130 and Trigonox 145), dicumyl-peroxide (DCUP) (for instance sold under the tradenames Luperox DC and Perkadox BC), di-tert.butyl-peroxide (DTBP) (for instance sold under the tradenames Trigonox B and Luperox Di), tert.butyl-cumyl-peroxide (BCUP) (for instance sold under the tradenames Trigonox T and Luperox 801) and bis(tert.butylperoxy-isopropyl)benzene (DIPP) (for instance sold under the tradenames Perkadox 14S and Lupperox DC). Suitable amounts of peroxide to be employed in accordance with the present invention are in principle known to the skilled person and can easily be calculated on the basis of the amount of polypropylene to be subjected to visbreaking, the $MFR_2$ (230° C.) value of the polypropylene to be subjected to visbreaking and the desired target $MFR_2$ (230° C.) of the polypropylene (B) to be obtained. Accordingly, typical amounts of peroxide visbreaking agent are from 0.005 to 0.5 wt.-%, more preferably from 0.01 to 0.2 wt.-%, based on the amount of propylene polymer employed. The propylene polymer and peroxide or propylene polymer/peroxide concentrate is introduced into a means for thermally plasticizing or melt blending and conveying the mixture, e.g., an extruder at elevated temperature. Residence time and temperature are controlled in relation to the particular peroxide selected (i.e., based on the half-life of the peroxide at the process temperature of the extruder) so as to effect the desired degree of polymer chain degradation.

Further, the polymer composition in accordance with the present invention may be prepared by compounding the components within suitable melt mixing devices for preparing polymeric compounds, including in particular extruders single screw extruders as well as twin screw extruders. Other suitable melt mixing devices include planet extruders and single screw co-kneaders. Especially preferred are twin screw extruders including high intensity mixing and kneading sections. Suitable melt temperatures for preparing the compositions are in the range from 170 to 300° C., preferably in the range from 200 to 260° C. and at a throughput of 10 to 500 kg/h and a screw speed of 50 to 200 rpm.

For the preparation of extrusion molded articles an extrusion blown process as known in the art is applied. For instance, for the production of 1 liter round bottles like used for testing in the inventive work a "Fischer Müller" Blow Molding Machine may be used. The main processing parameters for the production are as follows:

Temperature profile: 180 to 190° C. applied in extruder, adapter and head

Melt temperature measured: 180 to 190° C.

Speed of extruder (revolution per minute; rpm): 11 to 14 rpm

Die gap: the die gap was adjusted to get a bottle with a weight of 40 g with Borealis grade RB307MO Cycle time: 12 to 16 seconds The present invention will now be described in further detail by the examples provided below.

EXAMPLES

1. Definitions/Measuring Methods

The following definitions of terms and determination methods apply for the above general description of the invention as well as to the below examples unless otherwise defined.

NMR-Spectroscopy Measurements:

The $^{13}$C-NMR spectra of polypropylenes were recorded on Bruker 400 MHz spectrometer at 130° C. from samples dissolved in 1,2,4-trichlorobenzene/benzene-d6 (90/10 w/w). For the pentad analysis the assignment is done according to the methods described in literature: (T. Hayashi, Y. Inoue, R. Chüjö, and T. Asakura, Polymer 29 138-43 (1988). and Chujo R, et al, Polymer 35 339 (1994).

The NMR-measurement was used for determining the mmmm pentad concentration in a manner well known in the art.

Randomness

In the FTIR measurements, films of 250-mm thickness were compression moulded at 225° C. and investigated on a Perkin-Elmer System 2000 FTIR instrument. The ethylene peak area (760-700 cm$^{-1}$) was used as a measure of total ethylene content. The absorption band for the structure -P-E-P- (one ethylene unit between propylene units), occurs at 733 cm$^{-1}$. This band characterizes the random ethylene content. For longer ethylene sequences (more than two units), an absorption band occurs at 720 cm$^{-1}$. Generally, a shoulder corresponding to longer ethylene runs is observed for the random copolymers. The calibration for total ethylene content based on the area and random ethylene (PEP) content based on peak height at 733 cm$^{-1}$ was made by $^{13}$C-NMR. (Thermochimica Acta, 66 (1990) 53-68).

Randomness=random ethylene (-P-E-P-) content/the total ethylene content×100%.

Number average molecular weight ($M_n$), weight average molecular weight ($M_w$) and molecular weight distribution (MWD) are determined by size exclusion chromatography (SEC) using Waters Alliance GPCV 2000 instrument with online viscometer. The oven temperature is 140° C. Trichlorobenzene is used as a solvent (ISO 16014).

$MFR_2$ (230° C.) is measured according to ISO 1133 (230° C., 2.16 kg load).

Ethylene content is measured with Fourier transform infrared spectroscopy (FTIR) calibrated with $^{13}$C-NMR. When measuring the ethylene content in polypropylene, a thin film of the sample (thickness about 250 mm) was prepared by hot-pressing. The area of absorption peaks 720 and 733 cm$^{-1}$ was measured with Perkin Elmer FTIR 1600 spectrometer. The method was calibrated by ethylene content data measured by $^{13}$C-NMR.

Content of any one of the C4 to C20 α-olefins is determined with $^{13}$C-NMR; literature: "IR-Spektroskopie für Anwender"; WILEY-VCH, 1997 and "Validierung in der Analytik", WILEY-VCH, 1997.

The xylene cold solubles (XCS, wt.-%): Content of xylene cold solubles (XCS) is determined at 23° C. according ISO 6427.

The gel content is assumed to be identical to the xylene hot insoluble (XHI) fraction, which is determined by extracting 1 g of finely cut polymer sample with 350 ml xylene in a Soxhlet extractor for 48 hours at the boiling temperature. The remaining solid amount is dried at 90° C. and weighed for determining the insolubles amount.

Strain Hardening Behaviour (Melt Strength):

The strain hardening behaviour is determined by the method as described in the article "Rheotens-Mastercurves and Drawability of Polymer Melts", M. H. Wagner, Polymer Engineering and Science, MID-APRIL 1SW, Vol. 36, NO. 7, pages 925 to 935. The content of the document is included by reference.

Figure 2:
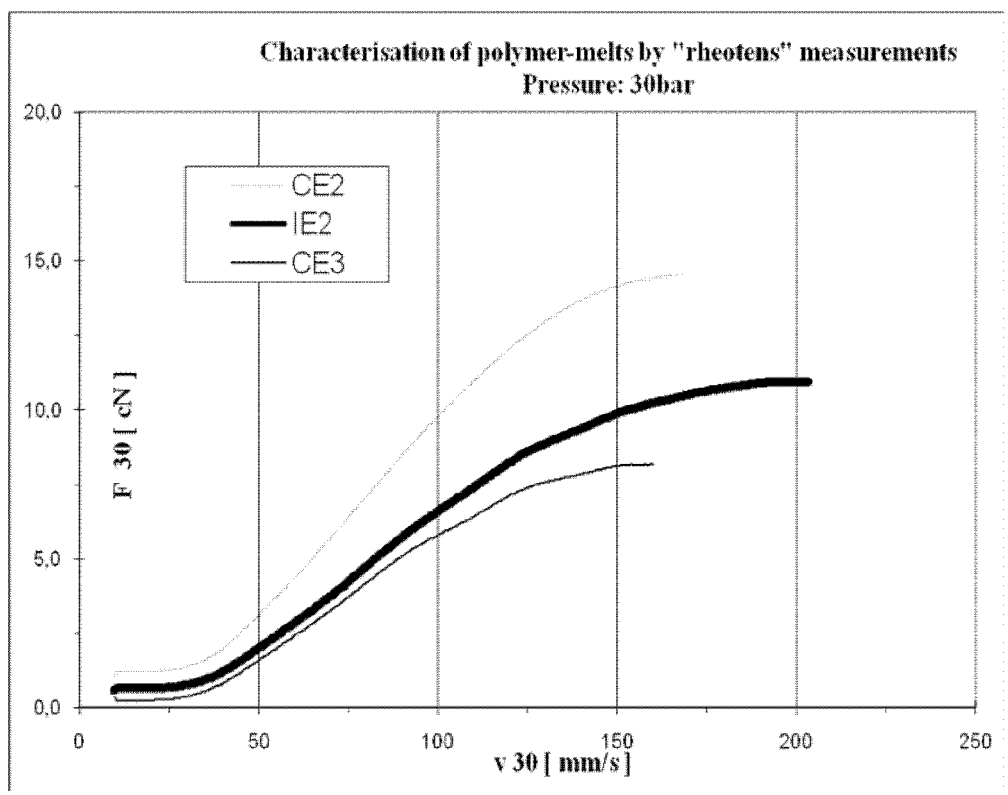
FIG. 2 is a chart depicting strain hardening behavior of polymer-melts of inventive and comparative examples.

For detailed explanation of the measuring method it is also referred to the FIGS. 1 and 2.

FIG. 1 shows a schematic representation of the experimental procedure which is used to determine strain hardening.

The strain hardening behaviour of polymers is analysed by Rheotens apparatus (1) (product of Göttfert, Siemensstr.2, 74711 Buchen, Germany) in which a melt strand (2) is elongated by drawing down with a defined acceleration. The haul-off force F in dependence of draw-down velocity v is recorded.

The test procedure is performed in a standard climatized room with controlled room temperature of 23° C. and 30 bar. The Rheotens apparatus (1) is combined with an extruder/melt pump (3) for continuous feeding of the melt strand (2). The extrusion temperature is 200° C.; a capillary die with a diameter of 2 mm and a length of 6 mm is used. The strength length between the capillary die and the Rheotens wheels is 80 mm. At the beginning of the experiment, the take-up speed of the Rheotens wheels was adjusted to the velocity of the extruded polymer strand (tensile force zero): Then the experiment was started by slowly increasing the take-up speed of the Rheotens wheels until the polymer filament breaks. The acceleration of the wheels was small enough so that the tensile force was measured under quasi-steady conditions. The acceleration of the melt strand (2) drawn down is 120 mm/sec$^2$.

The Rheotens was operated in combination with the PC program EXTENS. This is a real-time data-acquisition program, which displays and stores the measured data of tensile force and drawdown speed.

The schematic diagram in FIG. 1 shows in an exemplary fashion the measured increase in haul-off force F (i.e. "melt strength") versus the increase in draw-down velocity v (i.e. "drawability").

HAZE MEASUREMENT ON BOTTLES

Instrument: Haze-gard plus from BYK-Gardner
Testing: according to ASTM D1003 (as for injection molded plates)
The Bottles:
It is measured on the wall of the bottles. The top and bottom of the bottles is cut off. This round wall is then split in two, horizontally. Then the haze measurement and the wall thickness are done in six places around this wall, close to the middle. Then the haze value is reported as average of this six parallels.

Gloss Measurement on Bottles
Instrument: Sceen TRI-MICROGLOSS 20-60-80 from BYK-Gardner
Testing: ASTM D 2457 (as for injection molded plates)
The Bottles:
It is measured on the wall of the bottles. The top and bottom of the bottles is cut off. This round wall is then split in two, horizontally. Then this wall is cut into six equal samples of app. 90×90 mm, just to fit into a special light trap made for testing on injection molded parts. Then the gloss at 60° is measured on these six samples, and the average value is reported as gloss at 60°

Top Load

Aim of this measurement is to determine the stiffness of 1 liter round bottles. Determined by this method is the deformation force at 1 mm, 2 mm and 3 mm deformation of the round bottle. Additionally the maximum force $F_{max}$ and the deformation in mm at $F_{max}$ are determined.

The bottles have a height of 203 mm. The bottles are produced according to the description given below.

Before testing, the bottles are conditioned for 7 days at a temperature of 23° C. and at relative humidity of 50% (+/− 5%). The burr of the bottle orifice is removed.

Top load is tested at universal testing machine of the class 1 according to DIN 51221. Bottles to be tested are put between two parallel buffed plates of hardened steel, one plate is fixed and the other plate is moving. Force is recorded and results are given as $F_{max}$ (N) and Deformation at Maximum Force (mm).

Eight bottles are tested with speed of 10 mm/min by using 2.5 kN load cell. The test results of the eight tested bottles give the average value.

Weight Swell

The weight swell is a measurement that shows the fit in process ability of a polypropylene sample material compared to a defined reference grade.

The weight swell is defined as the ratio of the weight of a sample bottle, produced at defined reference conditions, to the weight of a standard bottle produced at reference conditions.

The formula is the following:

Weight swell (%)=weight of sample bottle (g)/weight of standard bottle (g)×100

Reference conditions are defined as the appropriate set of temperature (° C.), throughput of feeding extruder (rpm) and width of the die gap (mm) needed for the production of standard bottles showing exactly a weight of 40+/−1 g by using a defined standard polypropylene grade used for extrusion blow molding. The standard bottles described in this invention are produced from Borealis random polypropylene grade RB307MO (ethylene content about 4 wt.-%, $MFR_2$ (230° C.) about 1.5 g/10 min) under reference condition, meaning condition necessary to get to bottles with 40 g (+/−1 g).

2. Preparation of the Examples

The components were blended according to Table 1. For stabilization of the materials a conventional additive package has been used like 0.2 wt/% Irganox B225 (antioxidant masterbatch supplied by Ciba Specialty Chemicals, Switzerland) and 0.05 wt % Ca-Stearate (CAS-No. 1592-23-0). Blending took place in a twin screw extruder (PRISM TSE24 L/D ratio 40) with two high intensity mixing segments at temperatures between 190 and 240° C. at a through put of 10 kg/h and a screw speed of 50 rpm. The material was extruded to two circular dies of 3 mm diameter into a water bath for strand solidification and then pelletized and dried.

For the production of 1 liter round bottles like used for testing in the inventive work a "Fischer Müller" Blow Molding Machine was used. The main processing parameters for the production are as follows:

Temperature profile: 180 to 190° C. applied in extruder, adapter and head

Melt temperature measured: 180 to 190° C.

Speed of extruder (revolution per minute; rpm): 11 to 14 rpm

Die gap: the die gap was adjusted to get a bottle with a weight of 40 g with Borealis grade RB307MO Cycle time: 12 to 16 seconds

TABLE 1

Properties of the polypropylene compositions

| | R-PP [g] | HMS [g] | PP [g] | α-1 [g] | α-2 [g] | MFR* g/10 min | Haze [%] | Gloss inside [%] | Gloss outside [%] | Top load [N] | Weight Swell [%] |
|---|---|---|---|---|---|---|---|---|---|---|---|
| CE 1 | 99.60 | — | — | 0.40 | — | 2.6 | 17.0 | | | 230 | — |
| CE 2 | 99.60 | — | — | — | 0.40 | 1.5 | 15.0 | 14 | 13 | 255 | 100 |
| CE 3 | 97.10 | — | 2.50 | — | 0.40 | 3.8 | 10.3 | 18 | 20 | 240 | 73 |
| IE 1 | 89.60 | 7.50 | 2.50 | — | 0.40 | 3.0 | 9.5 | 17 | 20 | 250 | 79 |
| IE 2 | 82.10 | 15.0 | 2.50 | — | 0.40 | 3.0 | 9.6 | 22 | 20 | 320 | 94 |
| IE 3 | 87.10 | 7.50 | 5.0 | — | 0.40 | 4.5 | 8.8 | | | 240 | 66 |
| IE 4 | 77.10 | 15.00 | 7.5 | — | 0.40 | 5.4 | 9.4 | | | 270 | 64 |
| IE 5 | 67.10 | 25.00 | 7.5 | — | 0.40 | 8.2 | 8.6 | | | 195 | 47 |

*"MFR" is $MFR_2$ (230° C.)

R-PP: is the commercial random propylene ethylene copolymer "RB307MO" of Borealis with an ethylene content of 3.9 wt.-%, a $MFR_2$ (230° C.) of 1.5 g/10 min, a density of 902 kg/m³, xylene cold soluble fraction (XCS) of 7.0 wt.-% and a branching index g' of 1.0.

HMS: is the commercial high melt strength polypropylene Daploy™ WB180HMS of Borealis based on a propylene homopolymer, wherein the high melt strength polypropylene Daploy™ WB180HMS has a density of 905 kg/m³, a melting point of 165° C., $MFR_2$ (230° C.) of 6.0 g/10 min, a melt strength of 11.5 cN at a maximum speed of 242 mm/s, a xylene cold soluble fraction (XCS) of 2.5 wt.-% and a branching index g' of 0.64.

PP: is the commercial visbroken polypropylene "HL504FB" of Borealis with a $MFR_2$ (230° C.) of 450 g/10 min and a branching index g'

α-1: is the commercial α-nucleating agent Millad 3988 (bis (3,4,-di-methylbenzylidene) sorbitol)

α-2: is the commercial α-nucleating agent Millad NX 8000 (Nonitol,1,2,3,-trideoxy-4,6:5,7-bis-O-[(4-propylphenyl) methylene]-nonitol)

We claim:

1. A polypropylene composition comprising a random propylene copolymer (R-PP), a high melt strength polypropylene (HMS-PP), a polypropylene (B) and a clarifier (C), wherein
    (a) the random propylene copolymer (R-PP)

(i) comprises units derived from propylene and at least another $C_2$ to $C_{20}$ α-olefin and
(ii) has a higher branching index g' than the high melt strength polypropylene (HMS-PP),
(b) the high melt strength polypropylene (HMS-PP) has a branching index g' of less than 1.0,
(c) the polypropylene (B) has a $MFR_2$ (230° C.) measured according to ISO 1133 of at least 400 g/10 min,
(d) the clarifier (C) comprises at least one α-nucleating agent (N), and
(e) the polypropylene composition has a $MFR_2$ (230° C.) measured according to ISO 1133 of at least 2.0 g/10 min, wherein further,
(f) the polypropylene (B) is different to the random propylene copolymer (R-PP) at least in view of the melt flow rate $MFR_2$ (230° C.)
(g) the polypropylene (B) has a higher melt flow rate $MFR_2$ (230° C.) than the high melt strength polypropylene (HMS-PP) and
(h) the polypropylene (B) has been visbroken.

2. A polypropylene composition according to claim 1, wherein the polypropylene composition has a strain hardening behavior with a haul-off force $F_{max}$ of at least 7.0 cN and a draw down velocity $v_{max}$ of at least 180 mm/s.

3. A polypropylene composition according to claim 1, wherein the polypropylene composition has an xylene hot insoluble fraction (XHI) of not more than 1.0 wt.-%.

4. A polypropylene composition according to claim 1, wherein the polypropylene composition has a xylene cold soluble fraction (XCS) measured according to ISO 6427 of not more than 15.0 wt-%.

5. A polypropylene composition according to claim 1, wherein the amount of units derived from $C_2$ to $C_{20}$ α-olefins other than propylene is not more than 7.0 wt.-% in the polypropylene composition.

6. A polypropylene composition according to claim 1, wherein the amount of units derived from $C_2$ to $C_{20}$ α-olefins other than propylene is in the range of 1.0 to 7.0 wt.-% in the random propylene copolymer (R-PP).

7. A polypropylene composition according to claim 1, wherein the random propylene copolymer (R-PP) has a xylene cold soluble fraction (XCS) of not more than 15.0 wt-%.

8. A polypropylene composition according to claim 1, wherein the random propylene copolymer (R-PP) has a $MFR_2$ (230° C.) of not more than 4.5 g/10 min.

9. A polypropylene composition according to claim 1, wherein the high melt strength polypropylene (HMS-PP) has a strain hardening behavior with a haul-off force $F_{max}$ of at least 10.0 cN and a draw down velocity $v_{max}$ of at least 200 mm/s.

10. A polypropylene composition according to claim 1, wherein the high melt strength polypropylene (HMS-PP) comprises units derived from
(i) propylene and
(ii) bifunctionally unsaturated monomer(s) and/or multifunctionally unsaturated low molecular weight polymer(s).

11. A polypropylene composition according to claim 1, wherein the high melt strength polypropylene (HMS-PP) composition has an xylene hot insoluble fraction (XHI) of not more than 1.0 wt.-%.

12. A polypropylene composition according to claim 1, wherein the high melt strength polypropylene (HMS-PP) composition has a $MFR_2$ (230° C.) measured according to ISO 1133 of 1.0 to 10.0 g/10 min.

13. A polypropylene composition according to claim 1, wherein the polypropylene (B) is a propylene homopolymer (H-PP).

14. A polypropylene composition according to claim 1, wherein the visbroking ratio (final $MFR_2$ (230° C.)/initial $MFR_2$ (230° C.)) of the polypropylene (B) is 3.0 to 40.0.

15. A polypropylene composition according to claim 1, wherein the α-nucleating agent(s) (N) are selected from the group consisting of
(i) salts of monocarboxylic acids and polycarboxylic acids, and
(ii) dibenzylidenesorbitol and $C_1$-$C_8$-alkyl-substituted dibenzylidenesorbitol derivatives, and
(iii) salts of diesters of phosphoric acid, and
(iv) vinylcycloalkane polymer and vinylalkane polymer.

16. A polypropylene composition according to claim 1, wherein the polypropylene composition comprises
(a) 50.0 to 92.0 wt.-% of the random propylene copolymer (R-PP),
(b) 5.0 to 26.0 wt.-% of the high melt strength polypropylene (HMS-PP),
(c) 1.0 to 15.0 wt.-% of the polypropylene (B), and
(d) 0.01 to 5.0 wt.-% of the clarifier (C),
based on the total polypropylene composition.

17. A method for producing an extrusion blown molded product, comprising the steps of:
providing a polypropylene composition comprising a random propylene copolymer (R-PP), a high melt strength polypropylene (HMS-PP), a polypropylene (B) and a clarifier (C), wherein
(a) the random propylene copolymer (R-PP)
(i) comprises units derived from propylene and at least another $C_2$ to $C_{20}$ α-olefin and
(ii) has a higher branching index g' than the high melt strength polypropylene (HMS-PP),
(b) the high melt strength polypropylene (HMS-PP) has a branching index g' of less than 1.0,
(c) the polypropylene (B) has a $MFR_2$ (230° C.) measured according to ISO 1133 of at least 400 g/10 min,
(d) the clarifier (C) comprises at least one α-nucleating agent (N), and
(e) the polypropylene composition has a $MFR_2$ (230° C.) measured according to ISO 1133 of at least 2.0 g/10 min, wherein further,
(f) the polypropylene (B) is different to the random propylene copolymer (R-PP) at least in view of the melt flow rate $MFR_2$ (230° C.) and
(g) the polypropylene (B) has a higher melt flow rate $MFR_2$ (230° C.) than the high melt strength polypropylene (HMS-PP), and
(h) the polypropylene (B) has been visbroken; and
extruding an extrusion blown molded product using said polypropylene composition.

18. Extrusion blown molded article comprising a polypropylene composition comprising a random propylene copolymer (R-PP), a high melt strength polypropylene (HMS-PP), a polypropylene (B) and a clarifier (C), wherein
(a) the random propylene copolymer (R-PP)
(i) comprises units derived from propylene and at least another $C_2$ to $C_{20}$ α-olefin and
(ii) has a higher branching index g' than the high melt strength polypropylene (HMS-PP),
(b) the high melt strength polypropylene (HMS-PP) has a branching index g' of less than 1.0, (c) the polypropylene (B) has a $MFR_2$ (230° C.) measured according to ISO 1133 of at least 400 g/10 min,
(d) the clarifier (C) comprises at least one α-nucleating agent (N), and
(e) the polypropylene composition has a $MFR_2$ (230° C.) measured according to ISO 1133 of at least 2.0 g/10 min, wherein further,
(f) the polypropylene (B) is different to the random propylene copolymer (R-PP) at least in view of the melt flow rate $MFR_2$ (230° C.) and
(g) the polypropylene (B) has a higher melt flow rate $MFR_2$ (230° C.) than the high melt strength polypropylene (HMS-PP), and
(h) the polypropylene (B) has been visbroken.

19. Article according to claim 18, wherein the article is a bottle.

* * * * *